United States Patent [19]
Kobayashi et al.

[11] Patent Number: 5,178,027
[45] Date of Patent: Jan. 12, 1993

[54] SUPPORTING STRUCTURE FOR OUTPUT SHAFT OF AUTOMOTIVE AUTOMATIC POWER TRANSMISSION

[75] Inventors: Atsushi Kobayashi; Fumikazu Takaoka, both of Shizuoka; Morio Ito, Kanagawa, all of Japan

[73] Assignee: Jatco Corporation/Nissan Motor Company, Ltd., Japan

[21] Appl. No.: 761,510

[22] Filed: Sep. 18, 1991

Related U.S. Application Data

[63] Continuation-in-part of Ser. No. 467,012, Jan. 18, 1990, abandoned, and a continuation-in-part of Ser. No. 553,748, Jul. 18, 1990, abandoned.

[30] Foreign Application Priority Data

Jan. 19, 1989 [JP] Japan .................................. 1-3907

[51] Int. Cl.$^5$ .................... F16H 1/28; F16H 47/08
[52] U.S. Cl. .......................... 74/412 R; 74/413; 74/606 R; 475/59; 475/69; 475/71
[58] Field of Search ........... 74/410, 412, 413, 421 R, 74/606 R; 475/59, 69, 71

[56] References Cited

U.S. PATENT DOCUMENTS

| | | | |
|---|---|---|---|
| 4,280,374 | 7/1981 | Kubo et al. | 475/71 |
| 4,289,045 | 9/1981 | Brisabois | 475/71 |
| 4,528,869 | 7/1985 | Kubo et al. | 475/71 |
| 4,653,346 | 3/1987 | Kato et al. | 74/410 X |
| 4,716,786 | 1/1988 | Sakakibara | 475/71 X |
| 5,055,098 | 10/1991 | Umebayashi et al. | 475/59 X |

FOREIGN PATENT DOCUMENTS

| | | | |
|---|---|---|---|
| 54-150554 | 11/1979 | Japan | 475/71 |
| 59-197670 | 11/1984 | Japan | 74/606 R |
| 60-84441 | 5/1985 | Japan | 475/71 |
| 2-190656 | 7/1990 | Japan | 74/606 R |
| 2030250 | 4/1980 | United Kingdom | 475/71 |

Primary Examiner—Richard Lorence
Assistant Examiner—Julie A. Krolikowski
Attorney, Agent, or Firm—Ronald P. Kananen

[57] ABSTRACT

A bearing structure for an output shaft of an automatic transaxle employs a ball bearing, radial needle bearing and a thrust needle bearing in combination. The ball bearing and the radial needle bearing radially support the output shaft. On the other hand, the thrusting load to be exerted on the output shaft when it is driven by an output torque of the engine is received by the thrust needle bearing, and relatively small thrusting torque in reverse direction is received by the ball bearing. The ball bearing is provided on a side cover which is fixed to a transaxle casing. The radial thrust bearing is radially supported by the inner periphery of an output retainer. The thrust needle bearing is oriented at the opposite side to the ball bearing with respect to the output gear. A generally cylindrical retainer body having an axial end mating with a wall section of a transmission casing has a cylindrical projection extending from the axial end adjacent an inner circumferential edge. The cylindrical projection engages with an annular positioning groove formed on the inner periphery of the transmission casing. Fastening bolts extend axially to engage the axial end portion of the retainer for retaining the retainer on the transmission casing. The retainer defines a fluid path for supplying working fluid for a clutch drum. The fluid path opens to the axial end of the retainer so as to be connected with a fluid path defined through the transmission casing.

20 Claims, 4 Drawing Sheets

| | | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING MODE 1ST | | | ○ | | | | | | ○ | ○ | $\dfrac{1+\alpha_1}{\alpha_1}$ | 3.22 |
| | 2ND | | | ○ | | ○ | | | | ○ | | $\dfrac{\alpha_1+\alpha_2+\alpha_1\alpha_2}{\alpha_1(1+\alpha_2)}$ | 1.69 |
| | 3RD | | ○ | ○ | | | ○ | | | ○ | | 1 | 1 |
| | 4TH | | ○ | (○) | | | | ○ | | | | $\dfrac{1}{1+\alpha_2}$ | 0.69 |
| | ENGINE BRAKING MODE 1ST | | | (○) | ○ | ○ | ○ | | | | | | |
| | 2ND | | | (○) | ○ | ○ | | | | | | | |
| | 3RD | | ○ | (○) | ○ | | ○ | | | | | | |
| | 4TH | | ○ | (○) | | | | ○ | | | | | |
| 2ND RANGE | 1ST | | | ○ | | | | | | ○ | ○ | | |
| | 2ND | | | ○ | | ○ | | | | ○ | | | |
| 1ST RANGE | 1ST | | | ○ | | | | | ○ | ○ | | | |
| REVERSE | | ○ | | | | | | | ○ | | | $-\dfrac{1}{\alpha_2}$ | −2.22 |

FIG. 4

SUPPORTING STRUCTURE FOR OUTPUT SHAFT OF AUTOMOTIVE AUTOMATIC POWER TRANSMISSION

CROSS REFERENCE TO CO-PENDING RELATED APPLICATIONS

This application is a continuation-in-part application of the U.S. patent application Ser. No. 467,012, filed on Jan. 18, 1990, and of the U.S. patent application Ser. No. 553,748, filed on Jul. 18, 1990, both abandoned.

BACKGROUND OF THE INVENTION

1. Field of the Invention

The present invention relates generally to an automatic transaxle in a power train of an automotive vehicle. More specifically, the invention relates to a supporting structure and bearing structure for a rotary component, such as a rotary output shaft, of an automatic transaxle.

2. Description of the Background Art

One example of the conventional output shaft bearing structure for an automatic transaxle has been disclosed in "AUTOMATIC TRANSAXLE RN4F02A Type and RL4F02A Type Service Manual 1984", issued by Nissan Motor Company, Limited. In the disclosure of the above-identified publication, a counter shaft is provided in parallel relationship with an output shaft of an automatic power transmission section of the automatic transaxle. The output shaft of the transmission section is coupled with the counter shaft via an output gear and a counter gear. The counter shaft is connected to a differential gear unit. The output shaft and the output gear are formed integrally to each other. Such output shaft is supported by means of a pair of taper roller bearings.

Such prior proposed bearing structure is, however, not, completely satisfactory in terms of durability. Namely, the aforementioned structure of the bearing structure has a drawback in that wearing of the taper roller bearings is too substantial for lowering power transmission efficiency. In addition, one of the taper roller bearings oriented at the end of the output shaft is placed within a bearing receptacle groove formed in the output gear so as to reduce axial size. The presence of the bearing receptacle groove in the output gear definitely lowers rigidity of the output gear to cause gear noise.

Also, in the aforesaid disclosure, the support structure includes a retainer fixed onto a wall of a transmission casing. The output shaft as a rotary component of the automatic power transmission, extends through the retainer and is rotatably supported therein. A clutch drum is supported on the outer periphery of the retainer. A working fluid is supplied to the clutch drum through a fluid path defined through the transmission casing and the retainer.

In the prior proposed construction of the support structure as set forth above, a further drawback is encountered in that the configuration of the retainer becomes complicated and thus requires relatively large radial and axial sizes. Specifically, the retainer is positioned relative to the transmission casing by fitting the outer diametric section onto the wall section of the transmission casing. The retainer is rigidly fixed onto the transmission casing by means of fastening bolts extending through a flange section having a larger diameter than the outer diametric section. Such construction requires sufficient radial size of the retainer. Furthermore, the fluid path for supplying the working fluid to the clutch drum extends through a portion where the retainer and the transmission casing are interengaged with one another. As a result, it becomes necessary to form radial and axial fluid paths through the retainer. This necessarily expands the axial size of the retainer.

SUMMARY OF THE INVENTION

Therefore, it is an object of the present invention to provide a supporting structure for an output shaft of an automatic transaxle, which can solve the aforementioned drawback in the prior proposed structures.

Another object of the present invention is to provide a bearing structure for the output shaft of the automatic transaxle which can eliminate gear noise to be generated by an output gear.

A further object of the invention is to provide a bearing structure of the output shaft of the automatic transaxle, which can reduce magnitude of wearing in bearings and thereby provide substantially improved durability.

In order to accomplish aforementioned and other objects, a bearing structure for an output shaft of an automatic transaxle, according to the present invention, employs a ball bearing, radial needle bearing and a thrust needle bearing in combination. The ball bearing and the radial needle bearing radially support the output shaft. On the other hand, the thrusting load to be exerted on the output shaft when it is driven by an output torque of the engine, is received by the thrust needle bearing, and relatively small thrusting torque in reverse direction is received by the ball bearing. The ball bearing is provided on a side cover which is fixed to a transaxle casing. The radial thrust bearing is radially supported by the inner periphery of an output retainer. The thrust needle bearing is oriented at the opposite side to the ball bearing with respect to the output gear. According to one aspect of the invention, a bearing structure for an output shaft of an automatic transaxle for an automotive vehicle, which automatic transaxle includes an output shaft of an automatic power transmission mechanism, a counter shaft extending substantially parallel to the output shaft, an output gear fixed to the output shaft, a counter gear fixed to the counter shaft and meshed with the output gear, and the counter shaft being connected to a final drive, the bearing structure comprises:

a ball bearing mounted on a transaxle casing and rotatably supporting a first axial end of the output shaft, the bearing mating with a first axial end face of the output shaft;

a radial needle bearing mounted on an output retainer which is secured on the casing, the radial needle bearing being so oriented as to rotatably support a position of the output shaft in the vicinity of a second axial end opposite to the first end; and a thrust needle bearing mounted on the casing and disposed between a second axial end face oriented opposite side to the first axial end face, and a mating surface of the casing.

The output retainer is secured onto the radially extending section of the transaxle casing by means of a fastening bolt, and the thrust needle bearing is provided in a position radially offset from the fastening bolts. The thrust bearing is placed at a position radially and outwardly offset from the fastening bolt with respect to the output shaft.

A still further object of the present invention is to provide a support structure for a rotary component of an automatic power transmission which solves the problems in the prior art and thus permits the retainer to be made compact.

In order to accomplish this last mentioned and other objects, a support structure for an automatic power transmission, according to the present invention, comprises a generally cylindrical retainer body having an axial end mating with a wall section of a transmission casing. A cylindrical projection extends from the axial end at the orientation adjacent the inner circumferential edge. The cylindrical projection engages with an annular positioning groove formed on the inner periphery of the transmission casing. Fastening bolts extend axially to engage with the axial end portion of the retainer for retaining the retainer on the transmission casing. The retainer defines a fluid path for supplying working fluid for a clutch drum. The fluid path opens to the axial end of the retainer so as to be connected with a fluid path defined through the transmission casing.

According to one aspect of the invention, a support structure for an output shaft of an automatic power transmission which has a casing in which are housed a transmission gear assembly and a clutch assembly including a clutch drum, the support structure comprises:

an output retainer formed into essentially plane cylindrical configuration, the output retainer supporting the clutch face drum on the outer periphery thereof and having an axial end face mating with an annular contact plane defined on one side of a radial section of the casing;

a positioning projection extending from the axial end face at an orientation adjacent the radially inner end thereof;

a positioning projection receptacle defined on the inner periphery of the radial section of the casing for cooperating with the positioning projection on the output retainer for positioning the output retainer relative to the casing; and fastening bolts extending from the other side of the radial section for engagement with a threaded opening formed in the output retainer and opening to the axial end face.

The casing may define a first fluid path for feeding a working fluid therethrough, and the output retainer defines a second fluid path feeding the working fluid to the clutch drum therethrough, the first fluid path has an open end opening to the contact plane and the second fluid path has an open end opening to the axial end face so that fluid communication is established by interfacing the open ends of the first and second fluid paths. Also, it is preferred that the positioning projection is formed into cylindrical configuration.

Preferably, the support structure further comprises a seal ring disposed between the positioning projection and the outer periphery of the output shaft.

According to another aspect of the invention, a support structure for an output shaft of an automatic power transmission which has a casing in which are housed a transmission gear assembly and a clutch assembly including a clutch drum, the support structure comprises:

an output retainer formed into essentially plane cylindrical configuration, the output retainer supporting the clutch drum on the outer periphery thereof and having an axial end face mating with an annular contact plane defined on one side of a radial section of the casing;

a positioning projection extending from the axial end face at an orientation adjacent the radially inner end thereof;

a positioning projection receptacle defined on the inner periphery of the radial section of the casing for cooperating with the positioning projection on the output retainer for positioning the output retainer relative to the casing;

a first fluid path defined in the casing for feeding a working fluid therethrough, the first fluid path having an open end opening to the contact plane; and a second fluid path defined in the outer retainer for feeding the working fluid to the clutch drum therethrough, the second fluid path having an open end opening to the axial end face so that fluid communication is established by interfacing the open ends of the first and second fluid paths.

According to a further aspect of the invention, a support structure for an output shaft of an automatic power transmission which has a casing in which are housed a transmission gear assembly and a clutch assembly including a clutch drum, the support structure comprises:

an output retainer formed into essentially plane cylindrical configuration, the output retainer supporting the clutch drum on the outer periphery thereof and having an axial end face mating with an annular contact plane defined on one side of a radial section of the casing, the outer retainer being fixed to the casing by tightly interfacing the axial end face with the contact plane by means of fastening means oriented radially inside of the outer periphery of the output retainer;

a positioning means provided adjacent the axial end face and the contact surface, for positioning the retainer relative to the projection extending from the axial end face at an orientation adjacent the radially inner end thereof; and a fluid path means extending through the casing and the output retainer, for feeding a working fluid to the clutch drum, the fluid path means extending across the interface between the axial end face and the contact surface.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
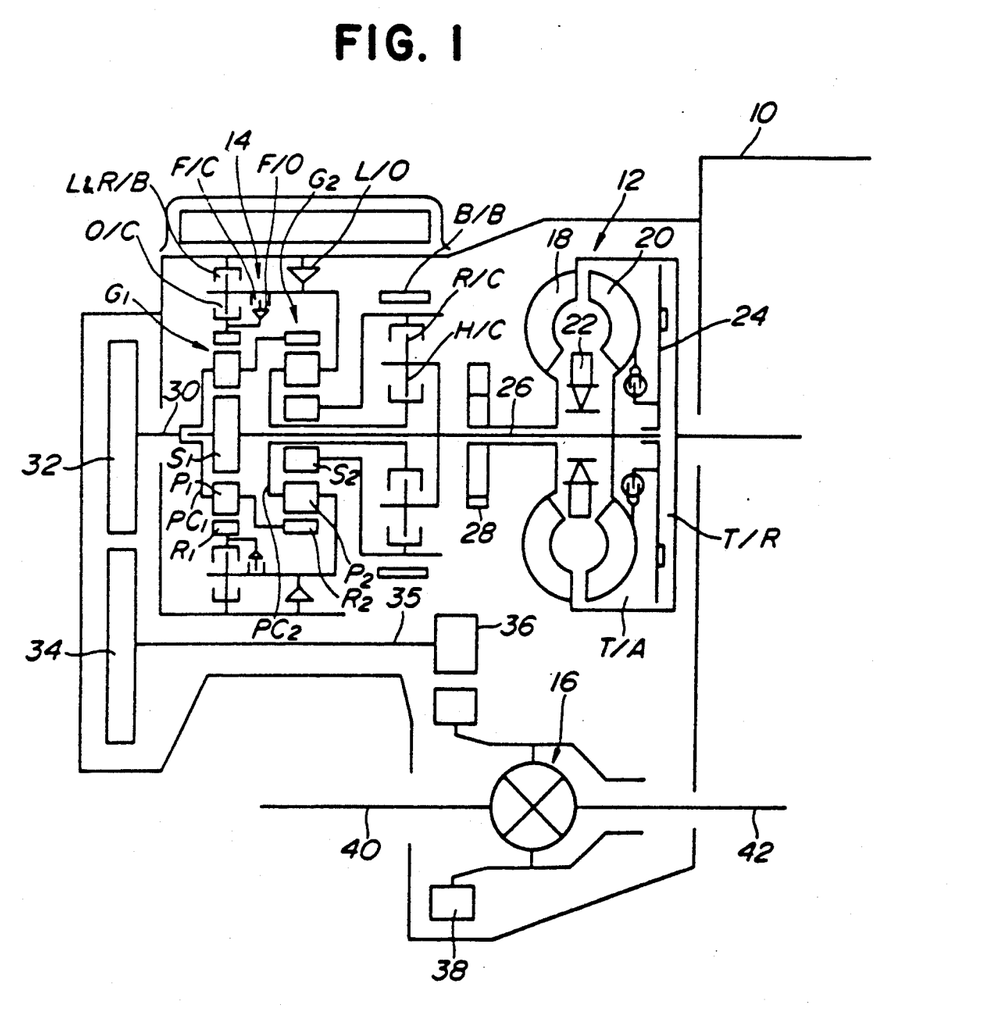
FIG. 1 is a skeleton diagram of an automatic transaxle for which the preferred embodiment of a bearing structure for an output shaft according to the present invention is applicable.

Referring now to the drawings, particularly to FIG. 1, there is illustrated an automatic transaxle which is designed for mounting transversely with respect to the vehicular longitudinal axis, and associated with an automotive internal combustion engine. The automatic transaxle includes an automatic power transmission having a torque converter 12 and a sun-and-planetary gear mechanism 14. The torque converter 12 is designed to be driven by the engine output for transmitting driving torque to the sun-and-planetary gear mechanism 14. The torque converter 12 has a pump impeller 18, a turbine runner 20, a stator 22 and a lock-up clutch 24. The turbine runner 20 is connected to an input shaft 26. While the lock-up clutch 24 is disengaged, the turbine runner 20 is hydrodynamically driven for rotatingly driving the input shaft 26 by the working fluid flow generated by rotation of the pump impeller 18 which is rigidly connected to the engine output shaft and thus driven by the engine output torque. On the other hand, when the lock-up clutch 24 is engaged, the input shaft 26 is mechanically coupled with the pump impeller so that the engine output torque is directly transmitted thereto. The pump impeller 18 drives an oil pump 28.

The look-up clutch 24 is operated to engage and disengage by the fluid pressure difference between an apply chamber T/A and a release chamber T/R.

The sun-and-planetary gear mechanism 14 has a first sun-and-planetary gear set $G_1$ and a second sun-and-planetary gear set $G_2$. The first sun-and-planetary gear set $G_1$ has a first sun gear $S_1$, a first ring gear $R_1$, first pinions $P_1$ meshing with the first sun gear and the first ring gear, and a first pinion carrier $PC_1$ supporting the first pinions. The second sun-and-planetary gear set $G_2$ has a second sun gear $S_2$, a second ring gear $R_2$, second pinions $P_2$ meshing with the second sun gear and the second ring gear, and a second pinion carrier $PC_2$ supporting the second pinions. The first sun gear $S_1$ is constantly coupled with the input shaft 26. The first pinion carrier $PC_1$ and the second ring gear $R_2$ are constantly coupled with an output shaft 30 which is rotatably supported by the preferred embodiment of a bearing structure according to the present invention. The first ring gear $R_1$ can be coupled with the second pinion carrier via a series of a forward one-way clutch F/O and a forward clutch F/C, and via an over-run clutch O/C arranged parallel to the series of the forward one-way clutch and the forward clutch. The second sun gear is connectable with the input shaft 26 via a reverse clutch R/C. On the other hand, the second pinion carrier $PC_2$ is connectable with the input shaft 26 via a high clutch H/C. The second sun gear $S_2$ can be anchored on the stationary section by means of a band brake B/B. The second pinion carrier $PC_2$ can be anchored on a stationary section via a low one-way clutch L/O and via a low and reverse brake L&R/B, which low one-way clutch and low and reverse brake are arranged in parallel relationship to each other.

An output gear 32 is integrally formed with the output shaft 30. The output gear 32 meshes with a counter gear 34. The counter gear 34 is connected to a reduction gear 36 via a counter shaft 35 for synchronous rotation. The reduction gear 36 meshes with a ring gear 38 in a differential mechanism 16. Left and right drive axles 40 and 42 extend from the differential mechanism 16 for driving the front-left and front-right wheels, in the shown embodiment.

The sun-and-planetary gear mechanism 14 is operated by variation of combined states of the forward clutch F/C, the high clutch H/C, the over-run clutch O/C, the reverse clutch R/C, the band brake B/B, the low and reverse brake L&R/B, the forward one-way clutch F/O and the low one-way clutch L/O for establishing variation of rotating states of the sun gears $S_1$ and $S_2$, the ring gears $R_1$ and $R_2$, and the pinion carriers $PC_1$ and $PC_2$. By this, the rotation speed of the output shaft 30 versus the rotation speed of the input shaft 26 is determined.

Figure 3:
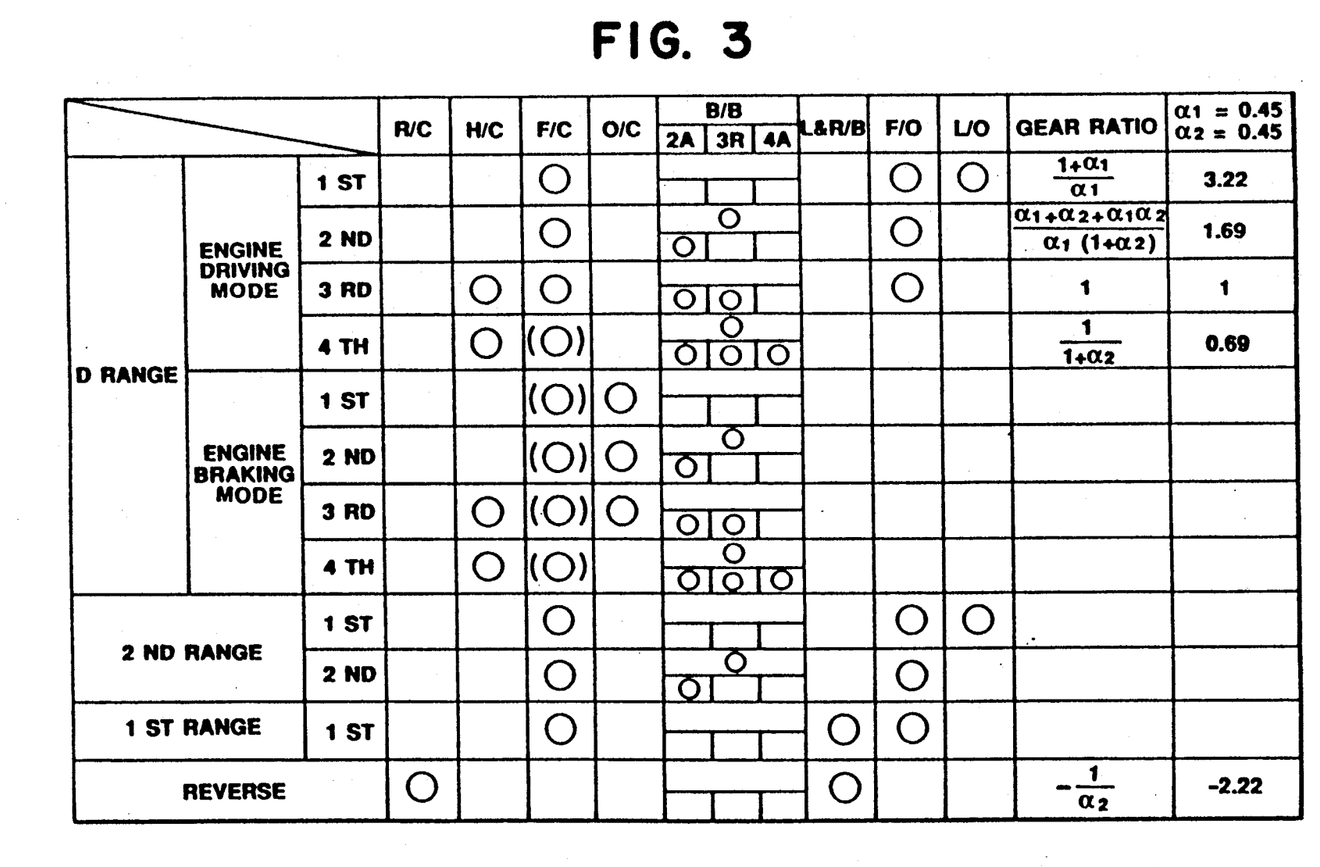
FIG. 3 is a table showing active components at respective transmission speed ratios in the automatic transaxle of FIG. 1.

FIG. 3 shows active components in four forward speed ratios and a single reverse speed ratio. In FIG. 3, the marking "o" shows an engaging state of the clutch and applied state of the brake. Also, in the column of the band brake, 2A denotes second speed servo apply chamber, 3R denotes third speed servo release chamber and 4A denotes fourth speed servo apply chamber. The marking "o" in the columns 2A, 3R and 4A represents the state in which the line pressure is supplied. $\alpha_1$ and $\alpha_2$ show the ratio of the number of gear teeth on the sun gears $S_1$ and $S_2$ versus the number of gear teeth of the ring gears $R_1$ and $R_2$. On the other hand, the gear ratio represents the ratio of the rotation speed of the output shaft 30 versus the rotation speed of the input shaft 26.

With the construction set forth above, the engine driving torque converted through the sun-and-planetary gear mechanism 14 is transmitted through the output shaft 30. The rotational torque of the output shaft 30 is transmitted to the ring gear 38 in the differential mechanism 16 via the output gear 32, the counter gear 34 and the reduction gear 36. The driving torque is then transmitted to the front wheels via the drive axles 40 and 42 for driving the latter for establishing four forward speed ratios and a single reverse speed ratio.

Figure 2:
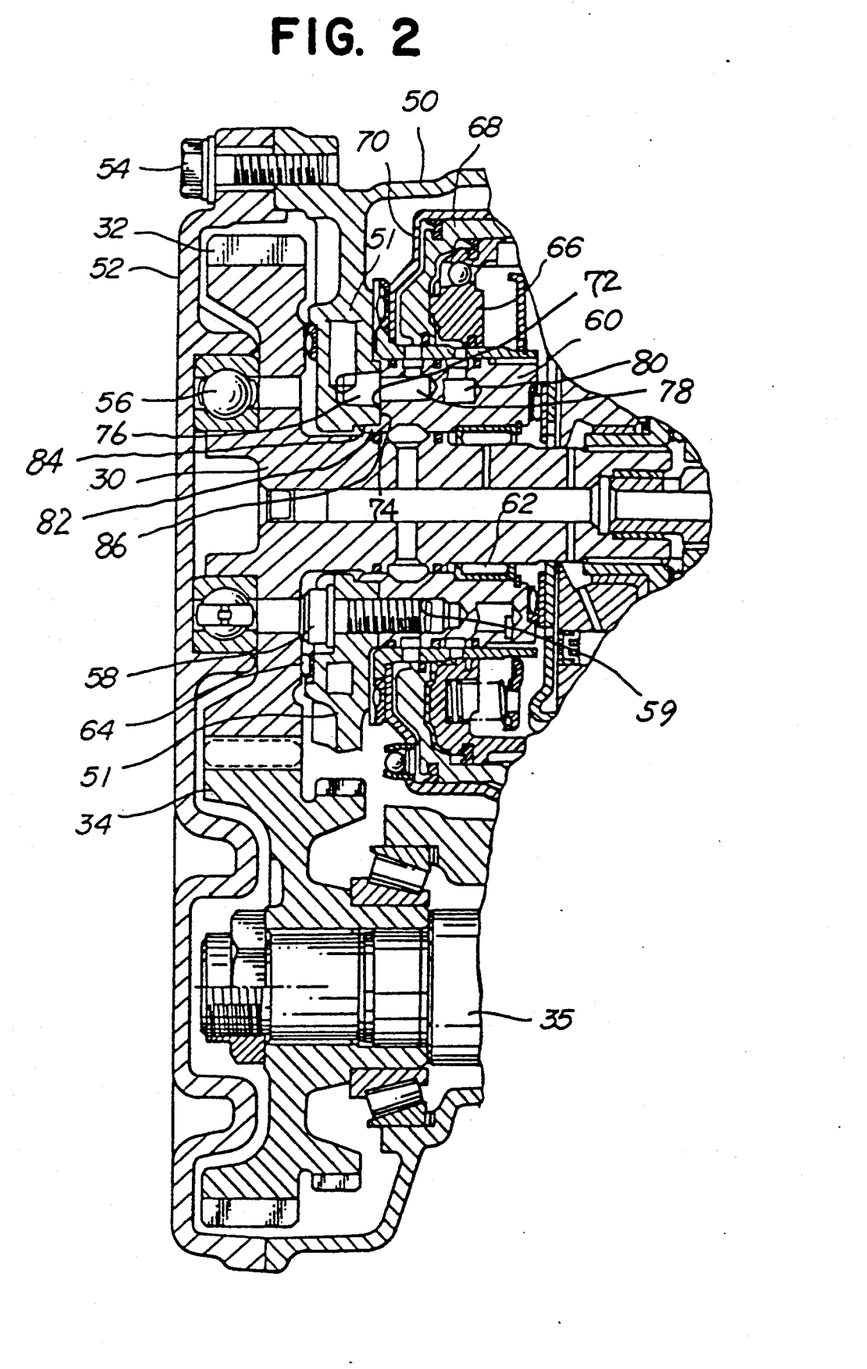
FIG. 2 is a partial section of an automatic transaxle including the preferred embodiment of a bearing structure according to the present invention.

As shown in FIG. 2, the automatic transaxle, according to the present invention, has a casing 50. A side cover 52 is secured on the casing 50 by means of fastening bolts 54 (only one is shown). One end of the output shaft 30, to which the output gear 32 is integrally formed and which is placed in the vicinity of the side cover 52, is supported via a ball bearing 56.

An output retainer 60 is secured to the casing 50 by means of fastening bolts 58 received in threaded openings 59. A radial needle bearing 62 is provided on the inner periphery of the output retainer 60. With the shown construction, the radial needle bearing 62 is oriented in the vicinity of the other end of the output shaft. A thrust needle bearing 64 is provided between a radial section 51 of the casing 50, and the output gear 32. As can be seen from FIG. 2, the thrust needle bearing 64 is offset radially outward of the fastening bolts 58 with respect to the output shaft 30.

A clutch drum 70 receiving therein pistons 66 and 68 of the over-run clutch O/C and the forward clutch F/C is arranged radially outside of the output retainer.

The output retainer 60 is formed generally in cylindrical configuration. The output retainer 60 has one axial end face 72 mating with a mounting plane 74 of the radial section 76 of the casing 50. The axial end face 72 is tightly fitted onto the mounting plane 74 with establishing a fluid communication between an axially extending section 76 of a fluid path defined in the casing 50, and an axially extending section 78 of a fluid path defined in the output retainer 60. The retainer 60 further defines another fluid path 80 which is also communicated with a fluid path (not shown) defined in the casing. From the radially inner periphery of the output retainer 60, essentially cylindrical projection 82 extends axially. In conformity with the cylindrical projection 82, an annular recess, or receptacle, 84 is formed on the inner periphery of the radial section 81. The cylindrical projection 82 interengages with the annular recess 84 for positioning the output retainer 60 relative to the casing 50. A seal ring 86 is disposed between the inner periphery of the cylindrical projection 82 and the outer periphery of the output shaft 30 for establishing a liquid tight seal.

In operation, the engine output torque is input to the torque converter 12 from the engine 10. The torque converter 12 transmits the driving torque to the automatic power transmission 14. The power transmission 14 modulates the driving torque at a selected speed ratio and output to the reduction gear 36 of the differential mechanism 16 via the output shaft 30, the output gear 32, the counter gear 34 and the counter shaft 35. During transmission of the driving torque, radial load and thrusting load are exerted on the output shaft 30. Most of the radial direction force exerted on the output shaft 30 is received by the ball bearing 56. Remaining radial direction force is received by the radial needle bearing 62. On the other hand, the axial direction force on the output shaft 30 is received by the thrust needle bearing 64. The orientation of the thrust needle bearing is selected to receive the thrusting force during engine driving state. Though the reverse direction thrusting force is generated during engine braking, such thrusting force can be received by the ball bearing 56 since the thrusting force to be produced at this state.

With the shown construction, since relatively large diameter of thrust needle bearing can be used for supporting the output shaft in the axial direction, deformation of the output gear can be successfully reduced for lowering gear noise level. Furthermore, since the thrust needle bearing is oriented at a position radially and outwardly offset with respect to the bolts for securing the output retainer, the axial dimension required for facilitating the bearing can be reduced for allowing reduction of the overall size of the automatic transaxle. Furthermore, since the ball bearing, the radial needle bearing and the thrust needle bearing have smaller friction, magnitude of wearing can be maintained smaller so as to maintain higher power transmission efficiency.

During operation of the automatic power transmission set forth above, the working fluid is supplied to the clutch drum 70 via the fluid path 78 and so of the output retainer 60.

In the shown construction, since the axially extending section 78 and 80 opens to the axial end face 72 of the output retainer 60 to be connected to the axially extending sections of the fluid path in the casing.

With the construction set forth above, since the fluid paths in the output retainer 60 and the casing 50 can be connected by face-to-face contact between the axial end of the output retainer and the casing, no extra axial length of the output retainer is required. Also, since the axial end of the output retainer is directly secured by means of the fastening bolts 58, no radially extending flange is required. Furthermore, in the shown embodiment, the output retainer 60 is formed into simple cylindrical configuration. For these reasons, the output retainer can be reduced in size for permitting reduction of the overall size and weight of the automatic power transmission.

Therefore, the invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 4:
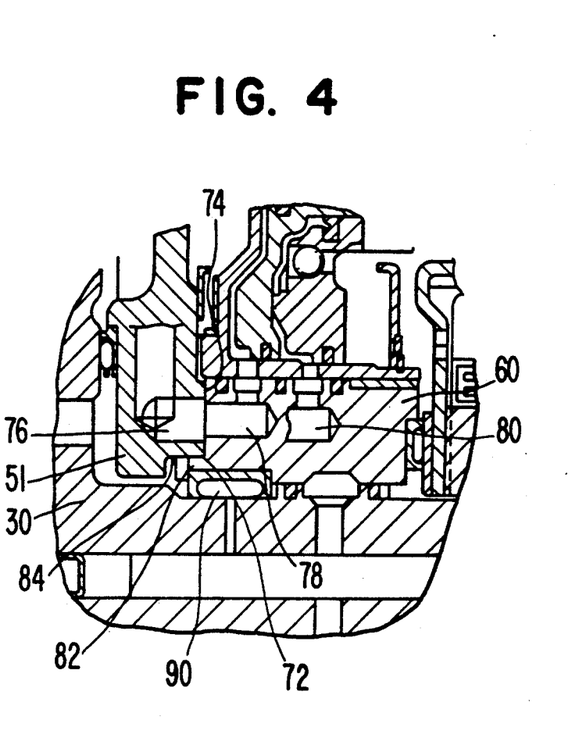
FIG. 4 is a section of a may or part of a modified embodiment of a support structure according to the invention.

For example, though the foregoing embodiment employs a seal ring disposed between the output retainer 60 and the output shaft 30, the seal ring may be replaced with a needle bearing or bushing 90 as shown in FIG. 4.

We claim:

1. A bearing structure for an output shaft of an automatic transaxle for an automotive vehicle, which automatic transaxle includes an output shaft of an automatic power transmission mechanism, a counter shaft extending substantially parallel to said output shaft, an output gear fixed to said output shaft, a counter gear fixed to said counter shaft and meshed with said output gear, and said counter shaft being connected to a final drive, said bearing structure comprising:
   a ball bearing mounted on a transaxle casing and rotatably supporting a first axial end of said output shaft, said ball bearing mating with a first axial end face of said output shaft;
   a radial needle bearing mounted on an output retainer which is secured on said casing, said radial needle bearing being so oriented as to rotatably support said output shaft at a second axial end of said output shaft opposite to said first end; and
   a thrust needle bearing mounted on said casing and disposed between a second axial end face oriented at an opposite side of said output shaft to said first axial end face, and mating surface of said casing.

2. A bearing structure for an output shaft of an automatic transaxle for an automotive vehicle, which automatic transaxle includes an output shaft of an automatic power transmission mechanism, a counter shaft extending substantially parallel to said output shaft, an output gear fixed to said output shaft, a counter gear fixed to said counter shaft and meshed with said output gear, and said counter shaft being connected to a final drive, said bearing structure comprising:
   a ball bearing mounted on a transaxle casing and rotatably supporting a first axial end of said output shaft, said ball bearing mating with a first axial end face of said output shaft;
   a radial needle bearing mounted on an output retainer which is secured on said casing, said radial needle bearing being so oriented as to rotatably support said output shaft at a second axial end of said output shaft opposite to said first end; and
   a thrust needle bearing mounted on said casing and disposed between a second axial end face oriented at an opposite side of said output shaft to said first axial end face, and mating surface of said casing,
   wherein said output retainer is secured onto a radially extending section of said transaxle casing by means of a fastening bolt, and said thrust needle bearing is provided in a position radially offset from said fastening bolts.

3. A bearing structure as set forth in claim 2, wherein said thrust bearing is placed at a position radially and outwardly offset from said fastening bolt with respect to said output shaft.

4. A transaxle for an automotive vehicle having an output shaft, comprising:
   a casing, one end of said output shaft to which an output gear is formed being positioned near a portion of said casing, and an output retainer secured to said casing;
   a ball bearing mounted on said casing for rotatably supporting a first axial end of said output shaft, said first axial end having an end face, said ball bearing mating with said first axial and face of said output shaft;
   a bearing means mounted on said output retainer for rotatably supporting said output shaft at a second axial end of said output shaft opposite said first end, and
   a thrust needle bearing provided between a mating portion of said casing and said output gear and a second axial end face of said output shaft opposite said first axial end face,
   whereupon most of a radial load exerted on said output shaft is received by said ball bearing, a remaining portion of said radial load being received by said bearing means, and an axial direction load being received by the thrust needle bearing during an automobile engine driving state.

5. A transaxle for an automotive vehicle having an output shaft, comprising:
   a casing, one end of said output shaft to which an output gear is formed being positioned near a portion of said casing, and an output retainer secured to said casing;
   a ball bearing mounted on said casing for rotatably supporting a first axial end of said output shaft, said first axial end having an end face, said ball bearing mating with said first axial end face of said output shaft;
   a bearing means mounted on said output retainer for rotatably supporting said output shaft at a second axial end of said output shaft opposite said first end, and
   a thrust needle bearing provided between a mating portion of said casing and said output gear and a second axial end face of said output shaft opposite said first axial end face,
   whereupon most of a radial load exerted on said output shaft is received by said ball bearing, a remaining portion of said radial load being received by said bearing means, an axial direction load being received by the thrust needle bearing during an automobile engine driving state, and
   wherein said output retainer is secured to said casing by a bolt, said thrust needle bearing being oriented at a radially offset position with respect to said bolt, whereupon an axial dimension of said transaxle for facilitating said thrust needle bearing can be reduced.

6. The transaxle as set forth in claim 5 wherein said thrust needle bearing is placed at a position radially and outwardly offset from said bolt with respect to said output shaft.

7. The transaxle as set forth in claim 4 further including a counter shaft connected to a final drive and extending substantially parallel to said output shaft and meshed with said output gear on said output shaft.

8. The transaxle as set forth in claim 4 wherein said bearing means is a radial needle bearing.

9. A support structure for an output shaft of an automatic power transmission which has a casing in which are housed a transmission gear assembly and a clutch assembly including a clutch drum, said support structure comprising:
   an output retainer formed into essentially plane cylindrical configuration, said output retainer supporting said clutch drum on an outer periphery thereof and having an axial end face mating with an annular contact plane defined on one side of a radial section of said casing;
   a positioning projection extending from said axial end face at an orientation adjacent a radially inner end thereof;
   a positioning projection receptacle defined on an inner periphery of said radial section of said casing for cooperating with said positioning projection on said output retainer for positioning said output retainer relative to said casing; and
   fastening bolts extending from an other side of said radial section for engagement with threaded openings formed in said output retainer and opening to said axial end face.

10. A support structure as set forth in claim 9, wherein said casing defines a first fluid path for feeding a working fluid therethrough, and said output retainer defines a second fluid path feeding the working fluid to said clutch drum therethrough, said first fluid path has an open end opening to said contact plane and said second fluid path has an open end opening to said axial end face so that fluid communication is established by interfacing said open ends of said first and second fluid paths.

11. A support structure as set forth in claim 10, wherein said positioning projection is formed into cylindrical configuration.

12. A support structure as set forth in claim 11, which further comprises a seal ring disposed between said positioning projection and an outer periphery of said output shaft.

13. A support structure for an output shaft of an automatic power transmission which has a casing in which are housed a transmission gear assembly and a clutch assembly including a clutch drum, said support structure comprising:
   an output retainer formed into essentially plane cylindrical configuration, said output retainer supporting said clutch drum on an outer periphery thereof and having an axial end face mating with an annular contact plane defined on one side of a radial section of said casing;
   a positioning projection extending from said axial end face at an orientation adjacent an radially inner end thereof;
   a positioning projection receptacle defined on an inner periphery of said radial section of said casing for cooperating with said positioning projection on said output retainer for positioning said output retainer relative to said casing; and
   a first fluid path defined in said casing for feeding a working fluid therethrough, said first fluid path having an open end opening to said contact plane;
   a second fluid path defining in said outer retainer for feeding the working fluid to said clutch drum therethrough, said second fluid path having an open end opening to said axial end face so that fluid communication is established by interfacing said open ends of said first and second fluid paths.

14. A support structure as set forth in claim 13, which further comprises fastening bolts extending from an other side of said radial section for engagement with threaded openings formed in said output retainer and opening to said axial end face.

15. A support structure as set forth in claim 14, wherein said positioning projection is formed into cylindrical configuration.

16. A support structure as set forth in claim 15, which further comprises a seal ring disposed between said positioning projection and an outer periphery of said output shaft.

17. A support structure for an output shaft of an automatic power transmission which has a casing in which are housed a transmission gear assembly and a clutch assembly including a clutch drum, said support structure comprising:

an output retainer formed into essentially plane cylindrical configuration, said output retainer supporting said clutch drum on an outer periphery thereof and having an axial end face mating with an annular contact surface defined on one side of a radial section of said casing, said outer retainer being fixed to said casing by tightly interfacing said axial end face with said contact surface by means of fastening means oriented radially inside of the outer periphery of said output retainer;

a positioning means provided adjacent said axial end face and said contact surface, for positioning said retainer relative to said projection extending from said axial end face at an orientation adjacent an radially inner end thereof; and a fluid path means extending through said casing and said output retainer, for feeding a working fluid to said clutch drum, said fluid path means extending across the interface between said axial end face and said contact surface.

18. A support structure as set forth in claim 17, wherein said positioning means comprises a projection formed on and extending from one of said output retainer and said casing and a receptacle recess formed on an other of said output retainer and said casing.

19. A support structure as set forth in claim 18, wherein said projection is formed into cylindrical configuration.

20. A support structure as set forth in claim 19, which further comprises a seal ring disposed between said projection and the outer periphery of said output shaft.

* * * * *